(12) United States Patent
Timoney et al.

(10) Patent No.: US 8,327,966 B2
(45) Date of Patent: Dec. 11, 2012

(54) ARTICULATED DUMP TRUCK

(75) Inventors: Eanna Pronsias Timoney, Schull (IE); Sean Timoney, Dublin (IE)

(73) Assignee: Technology Investments Limited, Navan, County Meath (IE)

( * ) Notice: Subject to any disclaimer, the term of this patent is extended or adjusted under 35 U.S.C. 154(b) by 0 days.

(21) Appl. No.: 13/017,283

(22) Filed: Jan. 31, 2011

(65) Prior Publication Data

US 2011/0233887 A1    Sep. 29, 2011

Related U.S. Application Data

(63) Continuation of application No. 12/647,285, filed on Dec. 24, 2009, now abandoned, which is a continuation of application No. 10/574,270, filed on Jan. 22, 2007, now abandoned.

(51) Int. Cl.
*B60K 17/34* (2006.01)
(52) U.S. Cl. ........................ 180/235; 180/265
(58) Field of Classification Search .................. 180/235, 180/265, 418
See application file for complete search history.

(56) References Cited

U.S. PATENT DOCUMENTS

| | | | |
|---|---|---|---|
| 2,163,981 A | 6/1939 | Lawrence | |
| 2,278,303 A | 3/1942 | Blaser | |
| 2,321,832 A | 6/1943 | Leighton | |
| 3,414,072 A | 12/1968 | Hodges, Jr. et al. | |
| 3,446,175 A * | 5/1969 | Boehler et al. | 180/121 |
| 3,464,755 A * | 9/1969 | Brown | 298/22 R |
| 3,591,198 A | 7/1971 | Brando | |
| 4,099,733 A | 7/1978 | Ahonen | |
| 5,147,011 A | 9/1992 | Hvilka | |
| 5,222,574 A * | 6/1993 | Miller | 180/379 |
| 5,255,931 A * | 10/1993 | Hurlburt | 280/93.504 |
| 5,366,337 A * | 11/1994 | Eriksson | 414/550 |
| 5,538,274 A * | 7/1996 | Schmitz et al. | 280/124.142 |
| 5,820,150 A | 10/1998 | Archer et al. | |
| 6,105,984 A * | 8/2000 | Schmitz et al. | 280/124.136 |

(Continued)

FOREIGN PATENT DOCUMENTS

DE        2034995 A1    1/1972

(Continued)

OTHER PUBLICATIONS

English translation of abstract of FR2632265, 1 pg.

*Primary Examiner* — Tashiana Adams
(74) *Attorney, Agent, or Firm* — Holland & Knight LLP; Brian J. Colandreo, Esq.; Jeffrey T. Placker, Esq.

(57) ABSTRACT

An article dump truck has a front tractor unit connected to an associated rear trailer unit with a tipping container by an articulated coupling. The articulated coupling is operable to allow the front tractor unit and rear trailer unit to pivot about a vertical pivot axis, rams being provided to turn the front tractor unit and rear trailer unit about the pivot to steer the dump truck. The articulated coupling also allows the front tractor unit and rear trailer unit to rotate relative to each other about a longitudinal axis of the dump truck. In addition, the front tractor unit has a front chassis mounted on a pair of wheels by an independent suspension system.

20 Claims, 10 Drawing Sheets

U.S. PATENT DOCUMENTS

| | | | | |
|---|---|---|---|---|
| 6,116,697 | A * | 9/2000 | Smith et al. | 298/22 R |
| 6,361,269 | B1 * | 3/2002 | Cooper | 414/809 |
| 6,631,773 | B1 * | 10/2003 | Walker | 180/24.09 |
| 6,641,223 | B2 * | 11/2003 | Kingston | 298/22 P |
| 7,226,056 | B2 * | 6/2007 | Barron | 280/5.511 |
| 2003/0001426 | A1 * | 1/2003 | Kingston | 298/22 R |
| 2003/0094775 | A1 | 5/2003 | Pivac | |
| 2005/0178599 | A1 * | 8/2005 | Sakikawa | 180/235 |
| 2007/0126263 | A1 * | 6/2007 | Ramsey et al. | 296/203.01 |

FOREIGN PATENT DOCUMENTS

| | | |
|---|---|---|
| EP | 0287278 A1 | 10/1988 |
| EP | 1153772 | 11/2001 |
| FR | 1493241 A | 8/1967 |
| FR | 2148909 A5 | 3/1973 |
| FR | 2221294 A2 | 10/1974 |
| FR | 2632265 A1 | 12/1989 |
| GB | 1008045 | 10/1965 |

* cited by examiner

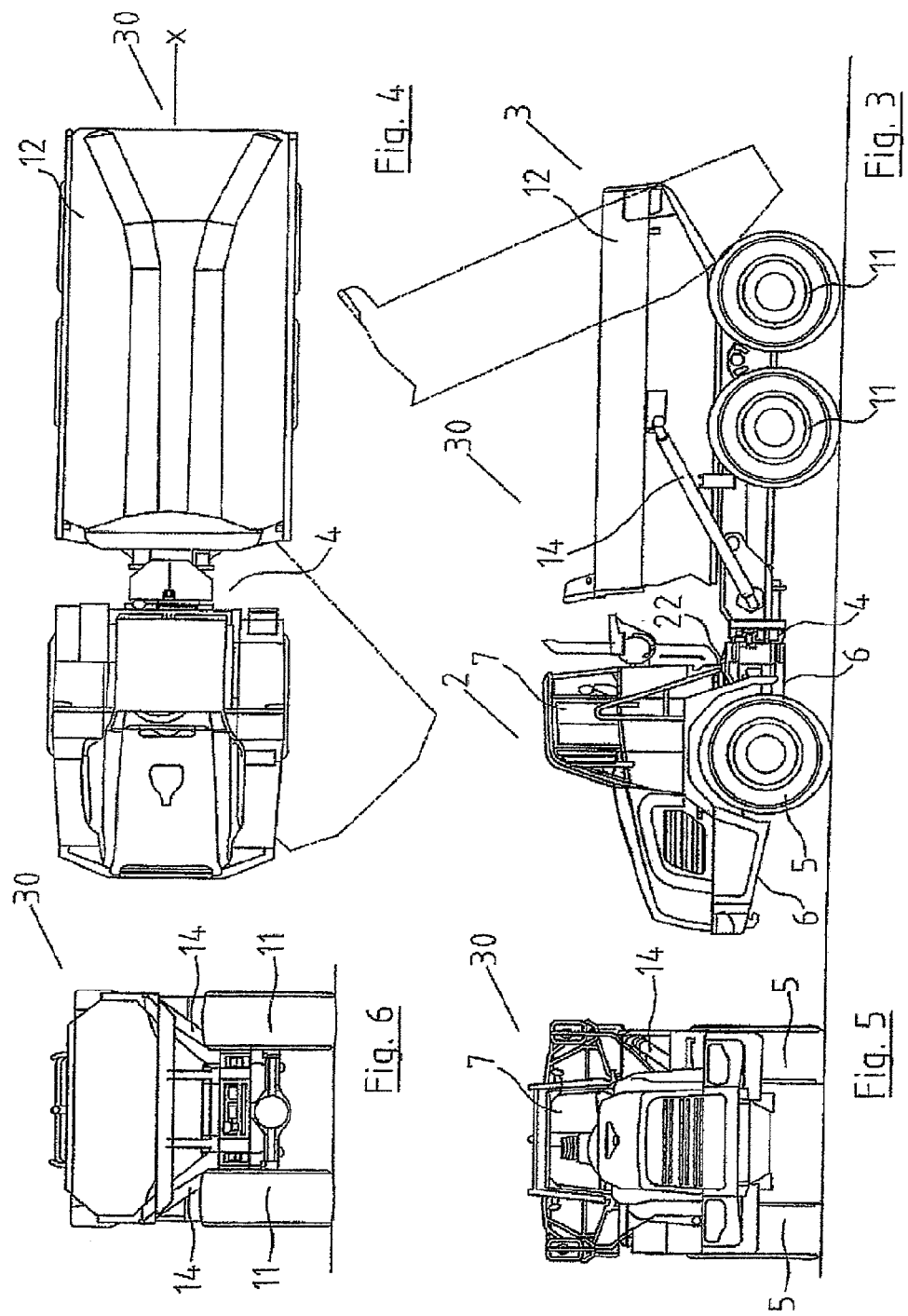

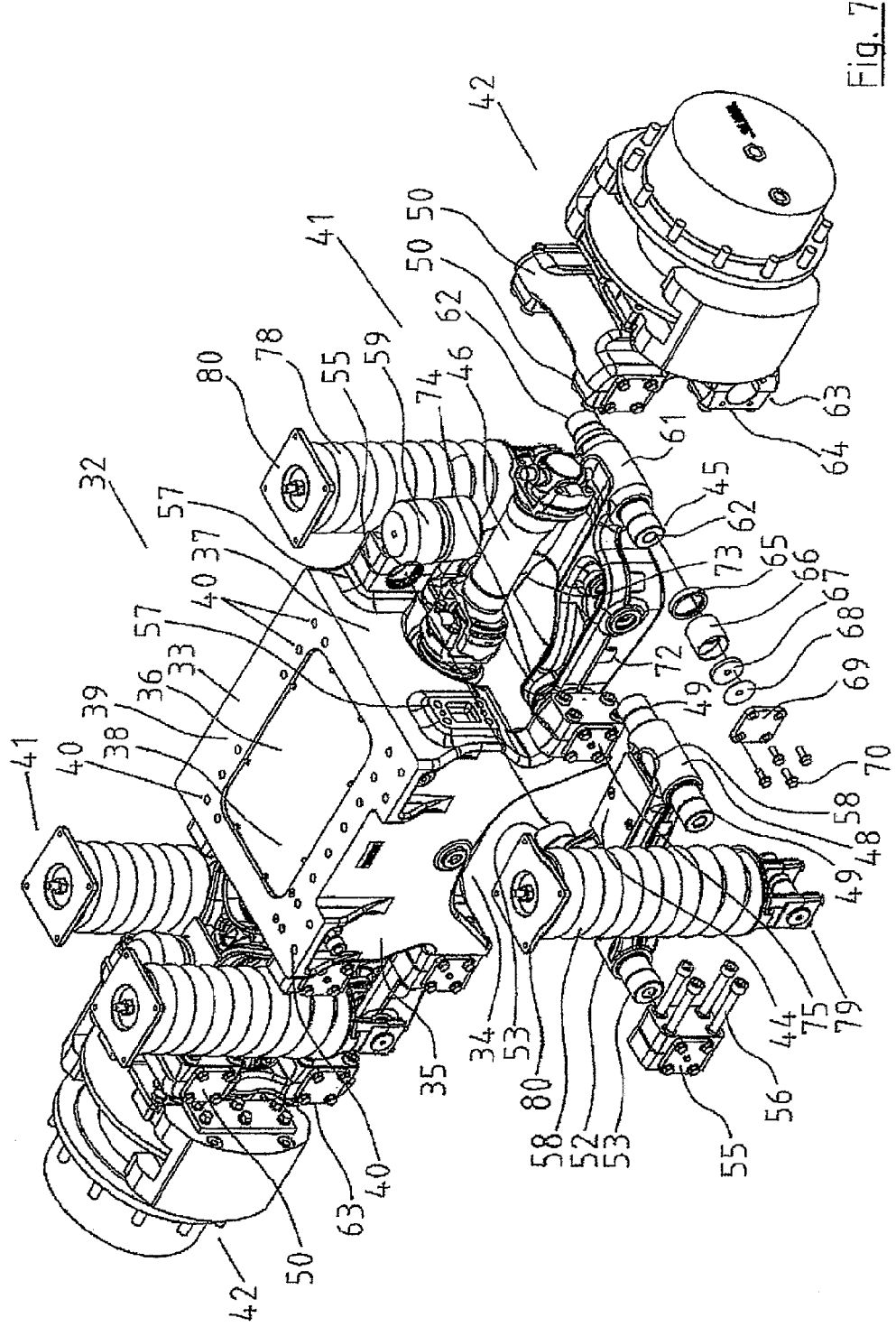

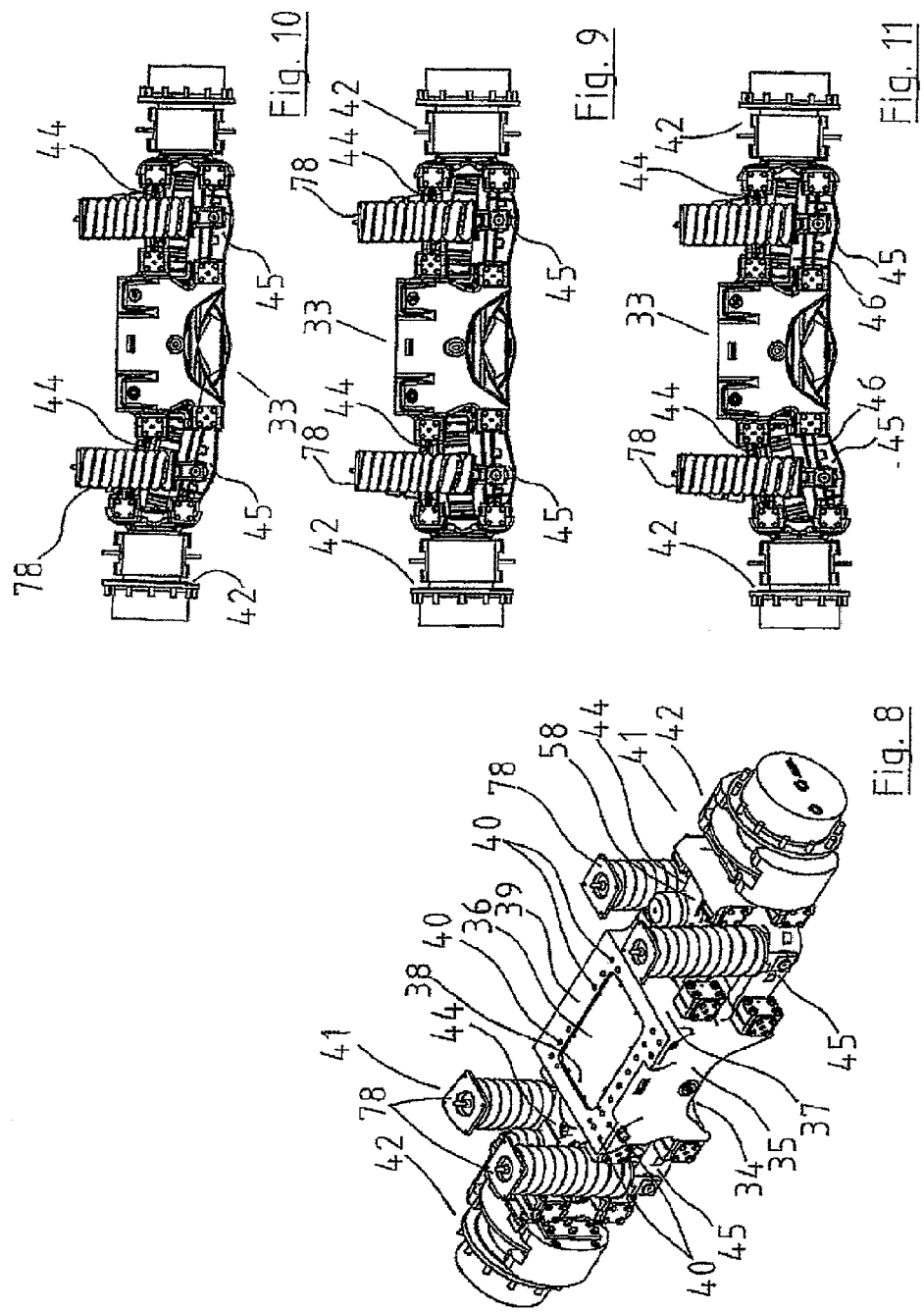

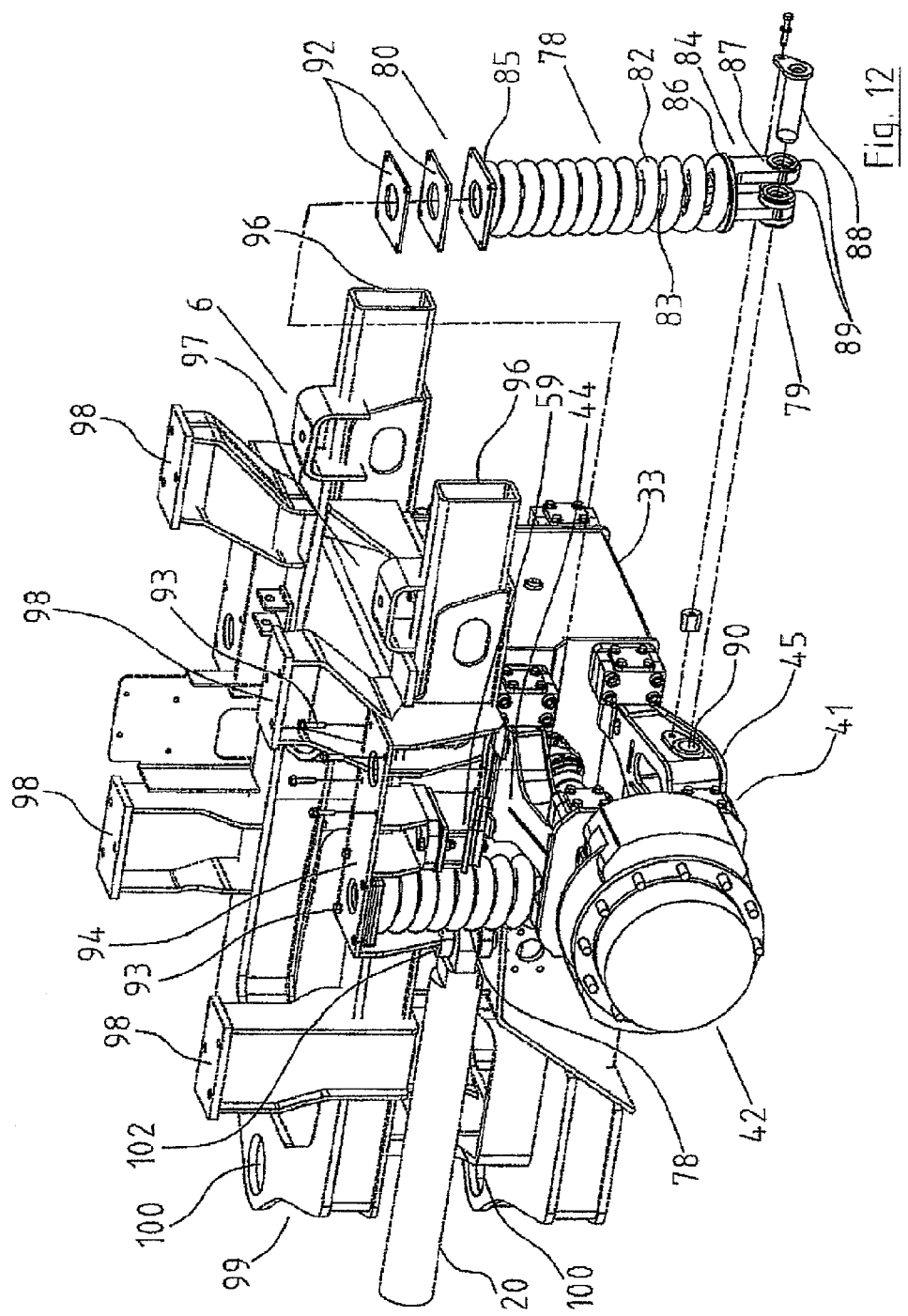

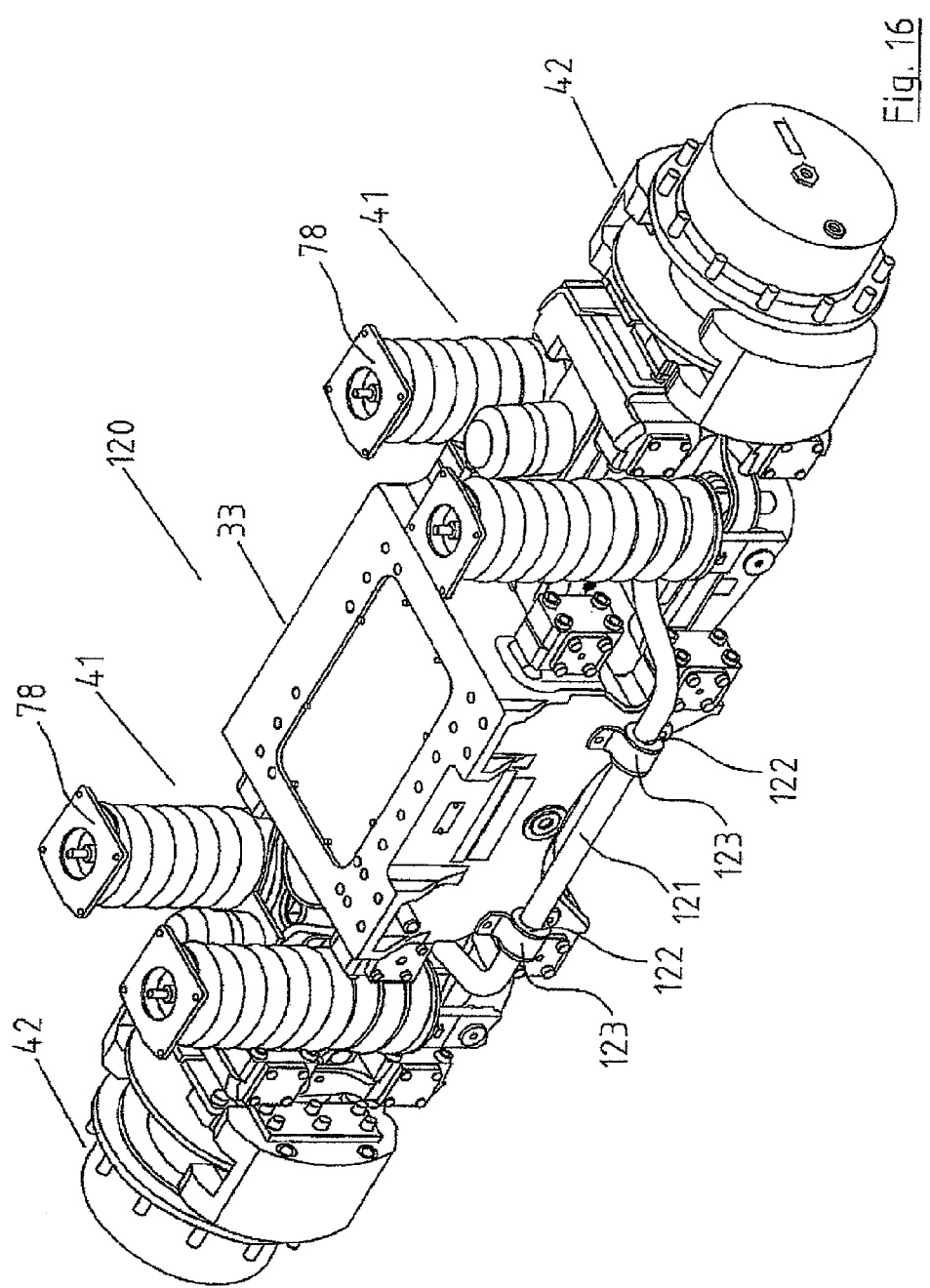

ARTICULATED DUMP TRUCK

RELATED APPLICATION

The subject application is a continuation application of U.S. patent application Ser. No. 12/647,285, filed on 24 Dec. 2009 now abandoned, which is a continuation of U.S. patent application Ser. No. 10/574,270, filed 22 Jan. 2007, (now abandoned), which claims the priority benefit of Ireland Patent Application No. S2003/0720, filed on 1 Oct. 2003, and Ireland Patent Application No. S2003/0721, filed on 1 Oct. 2003, the contents of which are herein incorporated by reference in its entirety.

BACKGROUND OF THE INVENTION

This invention relates to an articulated dump truck (ADT) which consists of two vehicle chassis frames mounted on wheels and linked by a steerable articulation joint, with a tipping load container mounted pivotally on the rear chassis while the front chassis carries the cab and prime mover. The articulation joint allows rotation around two axes, namely a first vertical axis and a second longitudinal axis. The rear chassis is mounted on four wheels, two wheels being displaced longitudinally on each side, while the front chassis is mounted on two wheels.

The vehicle is steered by controlling the relative rotation of the chassis frames around the vertical axis at the articulation joint, usually by means of hydraulic rams. The articulated joint also incorporates a large bearing with axis of rotation along the longitudinal axis of either the front or the rear chassis frame in order to decouple the roll of the front and rear chassis frames. This confers advantage in traversing rough terrain by allowing the front and rear chassis frames to maintain better wheel contact with the ground.

Existing designs of ADT provide limited or no roll compliance in the front vehicle suspension, relying mostly on this rotational degree of freedom around the longitudinal axis augmented by tyre compliance, to maintain wheel contact when traversing rough terrain. This approach works well at low speeds. However, at higher speeds single wheel bumps are accompanied by a severe dynamic rolling action of the entire front vehicle body about the longitudinal axis of the articulation joint. Also, due to the high driving position typical of these vehicles, this rolling action subjects the driver to significant lateral accelerations resulting in an uncomfortable ride. Thus the vehicle is effectively limited to low speed operation over rough terrain and this in turn limits productivity.

A suspension system is desirable in order to isolate the chassis frame and hence the driver from road inputs. It also helps to keep good contact between the wheels and the ground thus ensuring good traction at all times. Ideally for good ride the suspension should have a long wheel travel and a low natural frequency. This is achieved by using soft springs. Unsprung mass should also be minimised. Unfortunately, soft springs may result in excessive roll of the vehicle when cornering. Hence there is a trade off between the ride and handling properties of the vehicle. This trade off is particularly acute for ADTs. Inherent with the articulated steering system is the disadvantage that, as the vehicle turns, the outside wheel of the front chassis frame moves closer to the centreline of the load carrying rear chassis frame and consequently bears more of the front axle load. This significantly reduces the roll resistance of the front chassis frame giving rise to larger roll angles when cornering. This reduces stability and impacts on driver confidence.

The current state of the art for ADT front suspensions falls broadly into three groups. The most basic system comprises a beam axle mounted on a leading arm or frame pivotally connected to the front chassis frame on an axis parallel to the axle. This allows the wheels to move predominantly vertically but allows almost no suspension compliance in roll. Consequently this suspension can be fitted with very soft springs. A bump affecting both front wheels simultaneously can be negotiated with a high degree of comfort due to the soft springs. Single wheel bumps, however, are accompanied by a severe rolling action of the front chassis frame about the longitudinal axis of the articulation joint.

A second class of front suspension system comprises a beam axle mounted on a leading arm or frame pivotally connected to the front chassis frame by a ball joint with single or multiple control arms. The ball joint permits rolling of the front chassis relative to the front axle. The ability of the axle to roll relative to the chassis reduces the amount of lateral acceleration experienced by the driver when traversing single wheel bumps. However the suspension springs are now required to counter the tendency to roll when cornering. Increasing spring stiffness to counter excessive roll raises the suspension natural frequency and reduces suspension travel thus detracting from ride quality. Another disadvantage of this system is the large unsprung mass inherent in this design.

The third class of front suspension system used in state of the art ADTs has separate wheel carriers mounted on leading arms which are resiliently pivoted on the front chassis frame The leading arms have a rod and tube crosstie which keeps the wheels on the same axis while allowing rotation of one end of the crosstie with respect to the other. Combined with the compliance of the leading arm pivots, this allows the wheels a limited degree of articulation relative to each other in response to a single wheel bump.

In summary, none of the three presently used front suspension systems is able to offer drivers acceptable levels of both vertical and roll stability during operation at elevated forward speeds.

In the prior art GB1008045 (General Motors) discloses a dumper vehicle comprising a front and a rear chassis frame each supported on a pair of driven wheels and hinged together about a vertical steer axis located between the axes of rotation of the pairs of wheels and a tippable body which is pivoted on the rear frame and which, in its untipped position, extends over the steer axis, the centre of gravity of the body being located, in said untipped position, substantially mid-way between the said axes of rotation. The front and rear chassis frames only pivot about a single (vertical) axis for steering and thus this vehicle suffers from the rolling difficulties mentioned above.

As the vehicle has only four wheels the centre of gravity of the tippable body lies between the front and rear axles, substantially mid-way between the front and rear wheels putting considerable loading on the articulated connector.

GB1008045 (General Motors) further discloses such a dumper vehicle in which each pair of wheels is mounted on an axle connected to the associated chassis frame by a resilient suspension system so as to allow the axle to oscillate relative to the frame about a longitudinal axis. This appears to be the arrangement depicted in FIGS. 1 and 2, but it is not clear from the description how this is implemented. It also mentions the possibility that the wheels could be independently mounted on resilient suspension systems However this arrangement is not described and this proposal appears to have been incorporated without consideration of practical implementation. In practice, implementation of independent suspension would be difficult or impossible on a vehicle as shown in FIGS. 1 and 2 of GB1008045 because the large twin wheels shown, allow insufficient room to successfully install independent suspension.

U.S. Pat. No. 5,147,011 (Hvolka) describes a 'uni-body' digging service vehicle having an articulated chassis with a two-wheel front chassis frame plus four-wheel rear chassis frame. Here again, as with GB1008045, the articulation between front and rear sections occurs solely about a single vertical axis for steering purposes.

U.S. Patent Application Publication No. US2003/0094775 also discloses a forestry vehicle having a two-plus-four articulated chassis with articulation between front and rear segments only about a single vertical axis for steering purposes.

U.S. Pat. No. 3,414,072 (Hodges) discloses a highly maneuverable articulated vehicle, particularly for military use, comprising front and rear units each mounted on four wheels and interconnected by an articulated coupling. This construction facilitates travel over rough terrain as well as normal highway use. The driver and other personnel or cargo are carried in the rear unit.

SUMMARY OF THE INVENTION

According to the invention there is provided an articulated dump truck vehicle, including: a front tractor part connected to an associated rear trailer part by means of an articulated coupling which is mounted between a rear end of the tractor part and a front end of the trailer part, said articulated coupling being operable to allow the front tractor part and the rear trailer part to rotate relative to each other about a first vertical axis, with steering means for turning the front tractor part relative to the rear trailer part about said first vertical axis for steering the vehicle, and said articulated coupling also allowing the front tractor part and the rear trailer part to rotate relative to each other about a second longitudinal axis of the vehicle, the front tractor part having a front chassis, a pair of front wheels being mounted by a front suspension assembly on the front chassis, the rear trailer part having a rear chassis, at least two pairs of rear wheels mounted by a rear suspension assembly on the rear chassis, a prime mover mounted on said front tractor part and driveably connected to at least one pair of wheels on the vehicle, a vehicle driving station on said front tractor part with controls for vehicle drive and steering, a tipping container pivotally mounted on said rear trailer part with means for moving said tipping container on the rear chassis between a normally lowered load carrying position on the rear chassis and an inclined load tipping position on the rear chassis, characterised in that the front suspension assembly includes an independent suspension system for mounting the pair of front wheels on the front chassis of the front tractor part.

The invention provides an independent suspension system on the front chassis of an articulated dump truck of the type described herein. Before the present invention there has been no disclosure of this type of dump truck vehicle having in combination with an articulated joint which allows rotation about both vertical and longitudinal axes an independent front suspension system. This may be because of the significant difficulty in packaging a sufficiently robust independent suspension in a dump truck vehicle of this type and the failure to recognise the significant benefits which such a system confers. The fact that the longitudinal bearing in the articulation joint decouples the front and rear chassis frames in roll appears to have lead those versed in the art to discount the utility of providing increased roll compliance in the front suspension in order to improve the ride performance of the vehicle. When such compliance has been provided, relatively stiff springs have been employed to provide sufficient resistance to roll movements induced in cornering. Independent suspension on the other hand maximises the anti-roll moment for a given spring rate measured at the wheel because the springs effectively act at the wheels rather than at the spring location and consequently have a larger effective moment arm. The invention minimises lateral vibration of the cab and thus allows a driver to comfortably operate at higher speeds over rough ground with consequent increase in productivity. The modular design disclosed herein enables the invention to be carried out in a particularly robust and affordable manner.

In one embodiment of the invention front suspension assembly is an independent suspension module mounted on the front chassis.

In another embodiment said independent suspension module includes an axle housing with means for attachment to the front chassis, the two front wheels being pivotally mounted at opposite sides of said axle housing for vertical movement, each front wheel being mounted by one or more suspension arms on the axle housing, each suspension arm being pivotally connected to the axle housing and to a wheel carrier on which the front wheel is rotatable mounted to allow vertical movement of the wheel on the axle housing, and spring means mounted between a suspension arm or the wheel carrier and the front chassis to resist vertical wheel movement.

In another embodiment a pair of suspension arms are provided, namely an upper suspension arm and a lower suspension arm which are vertically spaced-apart, each of the upper suspension arm and the lower suspension arm having an inner end and an outer end, the inner end of each suspension arm being pivotally connected to the axle housing and the outer end of each suspension arm being pivotally connected to the wheel carrier.

In a further embodiment the front suspension assembly includes a suspension unit for each front wheel, said suspension unit having one or more suspension arms, each suspension arm being pivotally connected to the front chassis and to a wheel carrier on which the front wheel is rotatably mounted to allow vertical movement of the front wheel on the front chassis, and spring means mounted between a suspension arm or the wheel carrier and the front chassis to resist vertical wheel movement.

In another embodiment a pair of suspension arms are provided, namely an upper suspension arm and a lower suspension arm which are vertically spaced-apart, each of the upper suspension arm and the lower suspension arm having an inner end and an outer end, the inner end of each suspension arm being pivotally connected to the front chassis and the outer end of each suspension arm being pivotally connected to the wheel carrier.

In another embodiment the spring means includes a coil spring.

In another embodiment the spring means includes a pair of coil springs each having a lower end pivotally connected to the lower suspension arm and an upper end connected to the front chassis, the upper suspension arm extending between said pair of coil springs. Preferably an associated damper is provided with each spring.

In another embodiment each spring includes a coil spring and associated damper housed within the spring and mounted between a lower mounting bracket and an upper mounting plate, the lower mounting bracket having a spring holder with downwardly extending forked arms which engage the lower control arm by means of a pivot pin, the upper mounting plate being secured by bolts to the front chassis.

In a further embodiment a top of the axle housing is bolted to an underside of the front chassis.

In another embodiment the front chassis includes a pair of spaced-apart longitudinal members interconnected by cross members, the axle housing being bolted to an underside of cross members between the longitudinal members.

In another embodiment pivot pins are provided at each end of the control arms which rotatably engage in complementary pivot blocks mounted on the wheel carrier, on the axle housing or on the front chassis.

In another embodiment the upper suspension arm is I-shaped having a pair of laterally extending pivot pins at each end which project forwardly and rearwardly of the upper suspension arm to rotatably engage the pivot block.

In another embodiment the lower suspension arm is of wishbone construction and has a pair of laterally extending pivot pins at an outer end which project forwardly and rearwardly of the lower suspension arm to rotatably engage associated pivot blocks on the wheel carrier, inwardly extending fork arms of the lower suspension arm each having at their inner end a laterally extending pivot pin which rotatably engages an associated pivot block on the a) de housing or front chassis.

In another embodiment said tipping load container does not extend substantially over the steer axis so that the centre of gravity of the loaded container is normally between the axes of rotation of the rear wheels or only slightly in front of the axle closest to the steer axis In another embodiment an ant-roll bar is fitted to the front independent suspension.

In another embodiment the front wheels are steerable on the front chassis.

In another embodiment there is provided sensing means to measure one or more of the vehicle speed and the steer angles of the front wheels and of the articulation joint and control means to apportion steering action between the said front wheels and the articulation joint.

In another embodiment articulation around the vertical steering axis may be locked.

In a further embodiment the front wheel steering may be locked.

In another embodiment there is provided a motion control system having means for controlling operation of the vehicle suspension system in response to pitch, roll or yaw movement of the vehicle.

In another embodiment said means controls operation of the tractor suspension system in response to pitch, roll or yaw movement of the vehicle.

In a further embodiment there is provided a roll control system having means for controlling operation of the vehicle suspension system in response to roll of the vehicle.

In another embodiment said means controls operation of the tractor suspension system in response to roll of the tractor unit.

In another embodiment the roll control system includes means for stiffening the suspension in direct proportion to the amount of roll.

In a further embodiment there is provided means for locking the suspension when a preset roll angle is reached.

In another embodiment the roll control system includes means for controlling operation of the suspension system in response to the sensed turn angle between the tractor and the trailer.

In a further embodiment the roll control system includes means for sensing turning of the tractor unit relative to the trailer unit and suspension locking means operably connected to the sensing means to lock the suspension when a preset turn angle is reached, and release the suspension for normal operation below said preset turn angle.

According to another embodiment there is provided an articulated dump truck including a two-wheel tractor unit connected to an associated four-wheel trailer unit by an articulating hitch connector which allows relative rotation of the tractor unit and the trailer unit about a vertical axis and about a longitudinal axis of the dump truck, steering means for relative rotation of the tractor unit and the trailer unit about said vertical axis for steering the dump truck, said tractor unit having an independent suspension system.

In a further embodiment the suspension system for the front tractor unit is a fully independent suspension system.

BRIEF DESCRIPTION OF THE DRAWINGS

The invention will be more clearly understood by the following description of some embodiments thereof, given by way of example only, with reference to the accompanying drawings, in which:

FIG. 3 is an elevational view of another articulated dump truck according to a second embodiment of the invention;

FIG. 4 is a plan view of the articulated dump truck shown in FIG. 3;

FIG. 5 is a front elevational view of the articulated dump truck shown in FIG. 3;

FIG. 6 is a rear elevational view of the articulated dump truck shown in FIG. 3;

FIG. 7 is a detail, partially exploded, perspective view of a modular independent suspension system for a front tractor part of the articulated dump truck shown in FIG. 3;

FIG. 8 is another perspective view of the front independent suspension system;

FIG. 9 is an elevational view of the front independent suspension system;

FIG. 10 is another elevational view similar to FIG. 9 showing the front independent suspension system in another position of use;

FIG. 11 is another elevational view similar to FIG. 9 showing the front independent suspension system in a further position of use;

FIG. 12 is a detail perspective view showing the modular front independent suspension system of FIG. 7 mounted on a front chassis of the front tractor part of the articulated dump truck of FIG. 3;

FIG. 16 is a perspective view of another modular independent front suspension system for the articulated dump truck;

DETAILED DESCRIPTION OF PREFERRED EMBODIMENTS

Figure 2:
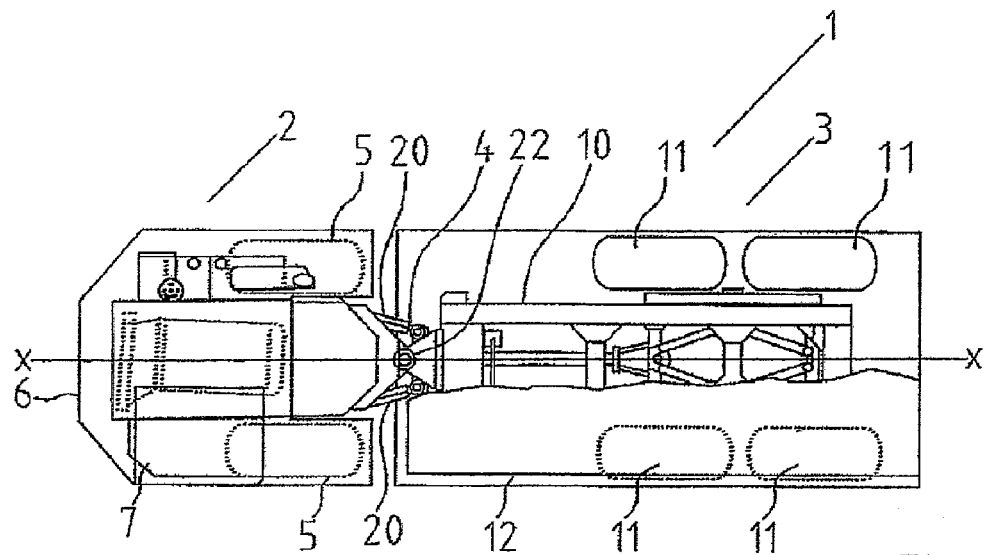
FIG. 2 is a plan view of the articulated dump truck.
Figure 1:
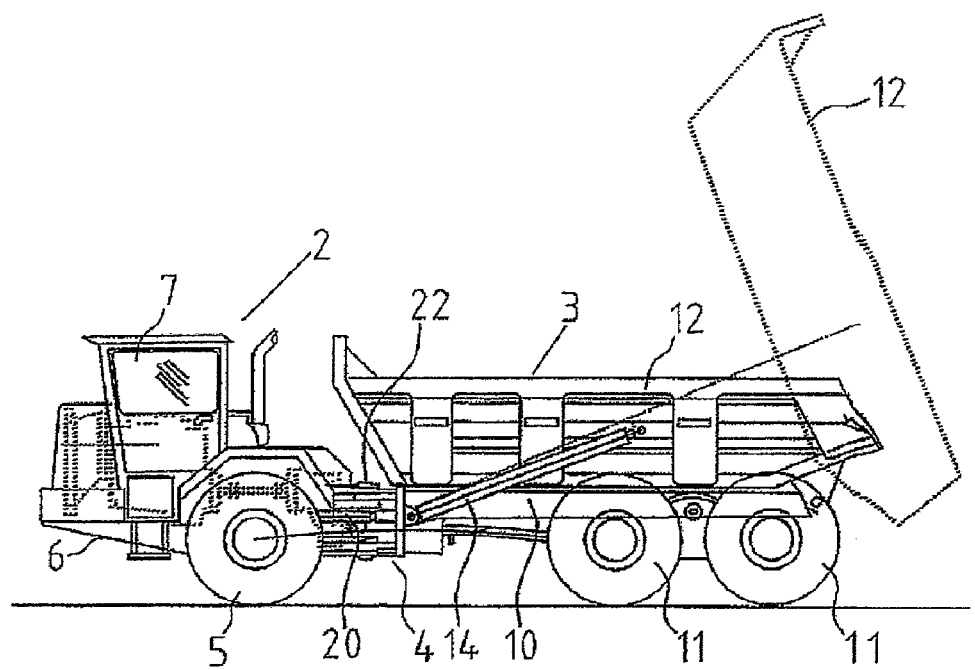
FIG. 1 is an elevational view of an articulated dump truck according to the invention.
Figure 13:
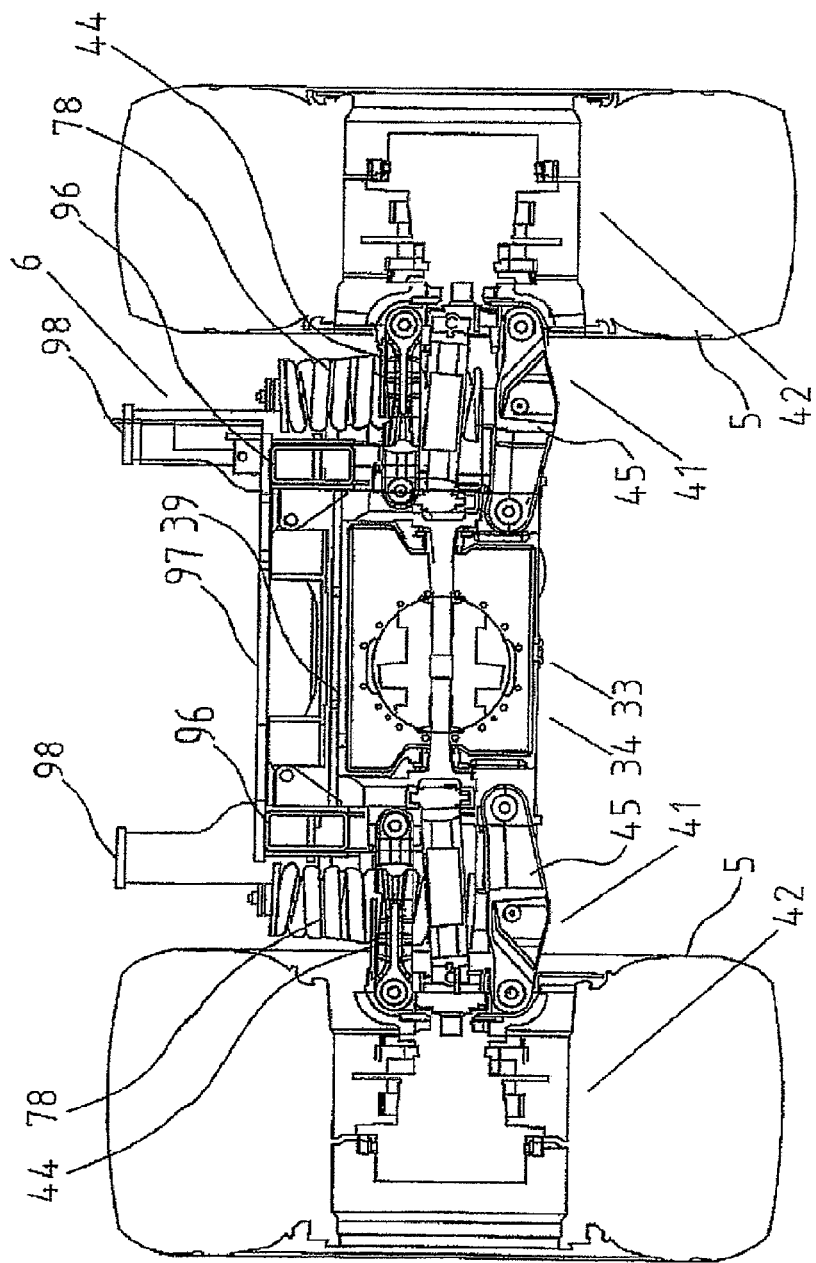
FIG. 13 is a detail partially sectioned elevational view showing the modular front independent suspension system of FIG. 7 mounted on the chassis of the front tractor part of the articulated dump truck of FIG. 3.
Figure 15:
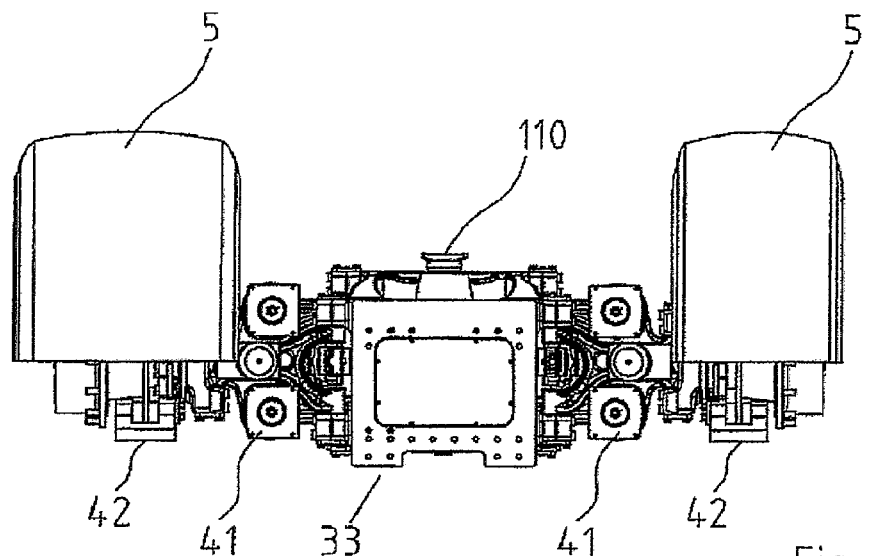
FIG. 15 is a plan view of the modular front independent suspension system.
Figure 14:
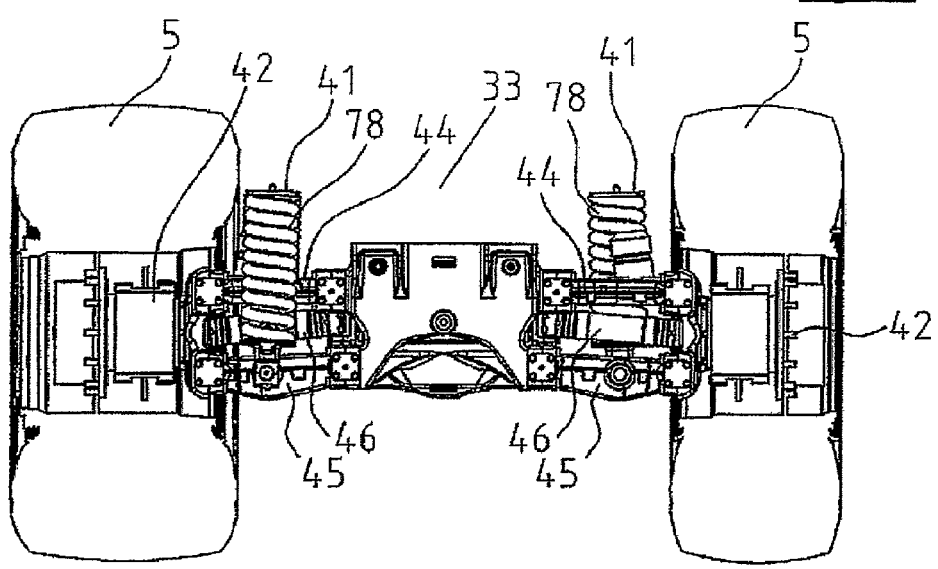
FIG. 14 is an elevational view of the modular front independent suspension system.

Referring to the drawings, and initially to FIGS. 1 and 2 thereof, there is illustrated an articulated dump truck vehicle according to the invention indicated generally by the reference numeral 1. The articulated dump truck 1 includes a front tractor unit 2 connected to an associated rear trailer unit 3 by an articulated coupling 4. The front tractor unit 2 is provided with an independent suspension system for mounting wheels 5 on a front chassis 6 of the front tractor unit 2.

The front tractor unit 2 has a cab 7 within which are located controls for driving and operation of the articulated dump truck 1.

The rear trailer unit 3 has a rear chassis 10 mounted on two pairs of wheels 11. A tipping container 12 is pivotaly mounted on the rear chassis 10 on which it can be tipped as shown in broken outline in FIG. 1 by means of rams 14 at each side.

The articulated coupling 4 can rotate about longitudinal axis X and vertical axis 22 of the truck 1 but is unable to rotate about a transverse axis of the truck 1. Steering is achieved by the forced articulation of the articulated coupling 4 about its vertical axis 22 by means of steering rams 20 extending between the front tractor unit 2 and rear trailer unit 3. These rams 20 are operable to pivot the front tractor unit 2 and rear trailer unit 3 about a vertical pivot 22 of the articulated coupling 4.

The tipping load container 12 in its untipped position does not extend substantially over the steer axis 22 so that the centre of gravity of the loaded container 12 is normally between the axes of rotation of the rear wheels 11 or only slightly in front of the middle axle.

It will be appreciated that any suitable independent suspension system may be employed for the tractor unit 2.

Referring now to FIGS. 3 to 13 of the drawings there is illustrated another articulated dump truck vehicle according to a second embodiment of the invention indicated generally by the reference numeral 30. Parts similar to those described previously have been assigned the same reference numerals. A modular independent front suspension system indicated generally by the reference numeral 32 for mounting the front wheels 5 on the front chassis 6 of the front tractor unit 2 is shown in FIGS. 7 to 15. This modular independent front suspension system 32 has an axle housing 33 which is bolted to the front chassis 6 and from which are hung the front wheels 5.

The axle housing 33 has a bottom 34 with upright front wall 35, rear wall 36 and side walls 37, 38. A top 39 of the axle housing 33 has a plurality of mounting holes 40 for reception of mounting bolts (not shown) which bolt the axle housing 33 to the front chassis 6. The axle housing 33 may be a casting or may be of fabricated construction.

At each side of the axle unit 33 a suspension unit 41 supports a wheel hub unit 42 which carries one of the front wheels 5. The wheel hub unit 42 is mounted for vertical movement by means of a pair of control arms of the suspension unit 41, namely an upper control arm 44 and a lower control arm 45, both of which extend between and are pivotally mounted on both the axle housing 33 and the hub unit 42. A drive shaft 46 is mounted between the upper control arm 44 and lower control arm 45 extending between the axle housing 33 and the hub unit 42 for drive transmission to the front wheels 5.

Each upper suspension control arm 44 has an outer end 48 with laterally extending pivot pins 49 which engage with associated pivot blocks 50 on an inside of the hub unit 42. Similarly, an inner end 52 of the upper control arm 44 has laterally extending pivot pins 53 which rotatably engage in associated pivot blocks 55 mounted on an exterior of the side wall 37, 38 of the axle housing 33. Each pivot block 55 is secured by screw bolts 56 on a complementary mounting plate 57 on the side wall 37, 38 of the axle housing 33. The pivot pins 49, 53 at the outer end 48 and the inner end 52 of the upper control arm 44 have parallel pivot axes. A striker plate 58 on top of the upper control arm 44 is engagable with an associated bump stop 59 which is mounted on the front chassis 6.

Each lower suspension control arm 45 is of wishbone construction. Pivot pins 62 at an outer end 61 of the lower control arm 45 engage associated pivot blocks 63 on an inner face of the hub 42. This pivot arrangement is similar to that for the upper control arm 44. Each pivot block 63 has a split housing 64 within which is mounted a seal 65 which seals between an inner end of the pivot block 63 and the pivot pin 62. The pivot pin 62 is supported in a bush 66 retained within the pivot block 63 by means of a washer 67, shim 68 and the end cover 69 of the pivot block 63. The end cover 69 is secured on the body 64 of the pivot block 63 by mounting bolts 70. Inwardly extending fork arms 72, 73 have at an inner end 74 of each fork arm 72, 73 a pivot pin which rotatably engages within an associated pivot block 75 as previously described. The pivot pins at inner and outer ends of the lower control arm 45 have parallel pivot axes.

A pair of spring and damper assemblies 78 each have a lower end 79 pivotally mounted on one of the wishbone arms 72, 73 and an upper end 80 which is attached to the front chassis 6. FIG. 9 shows the springs and suspension arms in a neutral position. FIG. 10 shows the suspension arms and spring assembly in full bump position at one side of the axle housing 33 and FIG. 11 shows the same suspension arms and spring assemblies in full rebound position.

FIG. 12 shows the spring and damper assembly 78 in more detail. A coil spring 82 and associated damper 83 housed within the spring 82 are mounted between a lower mounting bracket 84 and an upper mounting plate 85. The lower mounting bracket 84 has a spring holder 86 with downwardly extending forked arms 87 which engage with the lower control arm 45. A pivot pin 88 engages associated through holes 89 in said arms 87 and a through hole 90 in the lower control arm 45 to pivotally secure the lower end 79 of the spring and damper assembly 78 on the lower control arm 45. The upper mounting plate 85 is secured by bolts 93 to a laterally extending horizontal mounting flange 94 on the front chassis 6 above the suspension control arms 44, 45 with interposed spacer plates 92 if required.

It will be appreciated that any suitable spring means may be provided, for example single or multiple coil springs, hydro pneumatic elements or other spring arrangements.

The front chassis 6 has a pair of spaced-apart longitudinal members 96 interconnected by cross members 97. The axle housing 33 is bolted to an underside of some of the cross members 97. Cab mounting posts 98 project upwardly to receive and support the cab 7 of the vehicle. A pivot mounting frame 99 forming part of the articulated coupling 4 is provided at a rear end of the front chassis 6 and has vertically spaced-apart mounts 100 for pilot pins 22 of the articulated coupling 4. Support brackets 102 for attachment of the steering rams 20 are also provided at each side of the front chassis 6.

A drive assembly (not shown) is mounted within the axle housing 33. A drive input flange 110 (FIG. 15) at a rear of the axle housing 33 connects the drive assembly to a prime mover mounted on the front chassis 6. The drive assembly transmits drive through the drive shafts 46 which extend laterally from the axle housing 33 to the wheels 5.

The articulated coupling 4 essentially has two interconnected parts, namely a first part mounted on one of the front chassis 6 and rear chassis 10 and a second part mounted on the other of the front chassis 6 and the rear chassis 10. The first part is fixed on one chassis 6, 10 and interconnected with the second part by the vertical pivot 22. The second part is rotatably mounted on the other chassis 6, 10 for rotation about a longitudinal axis of said other chassis 6, 10. Steering rams 20 are provided for relative rotation of both coupling parts about the vertical pivot 22.

Referring now to FIG. 16 there is shown another modular independent suspension system 120 for the dump truck 30. This is largely similar to the suspension system of FIGS. 7 to 15 and like parts are assigned the same reference numerals. In this case the suspension system 120 further includes an anti-roll bar 121 which extends between and interconnects the suspension units 41 at opposite sides of the axle unit 33. The anti-roll bar 121 is rotatably mounted in associated bushings 122 secured by mounting brackets 123 on the front wall 35 of the axle unit 33.

Figure 17:
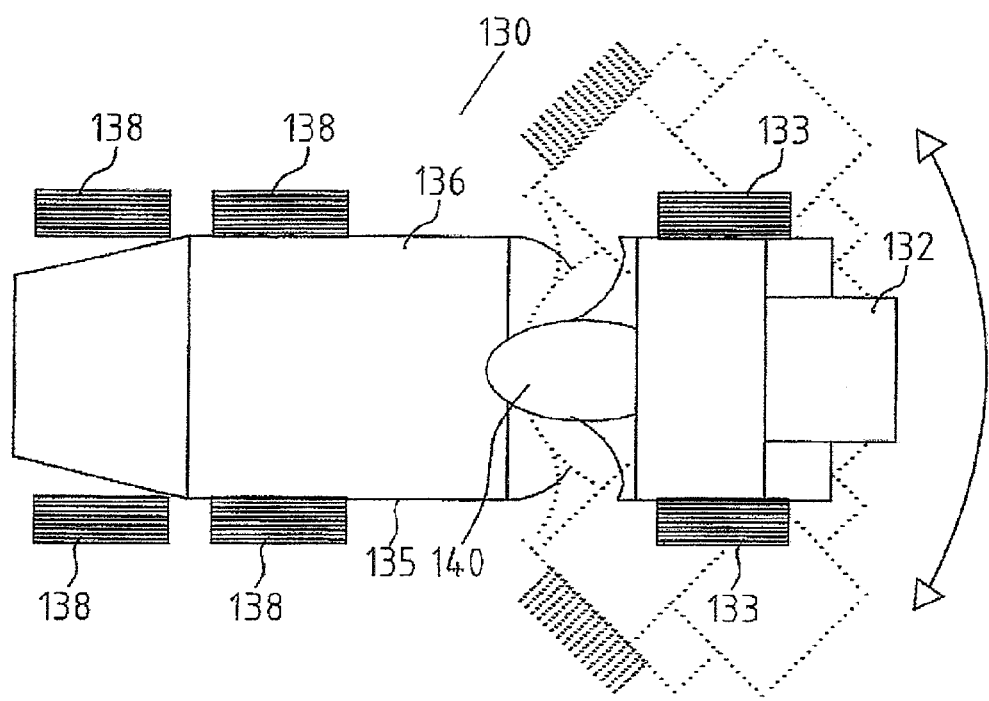
FIG. 17 is a diagrammatic plan view of another articulated dump truck incorporating a roll control system according to another embodiment of the invention.
Figure 18:
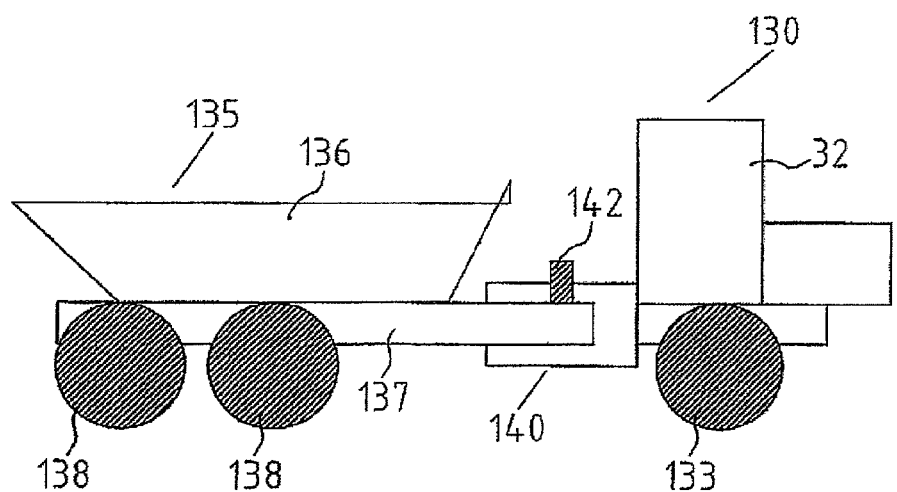
FIG. 18 is a diagrammatic elevational view of the articulated dump truck shown in FIG. 17.
Figure 19:
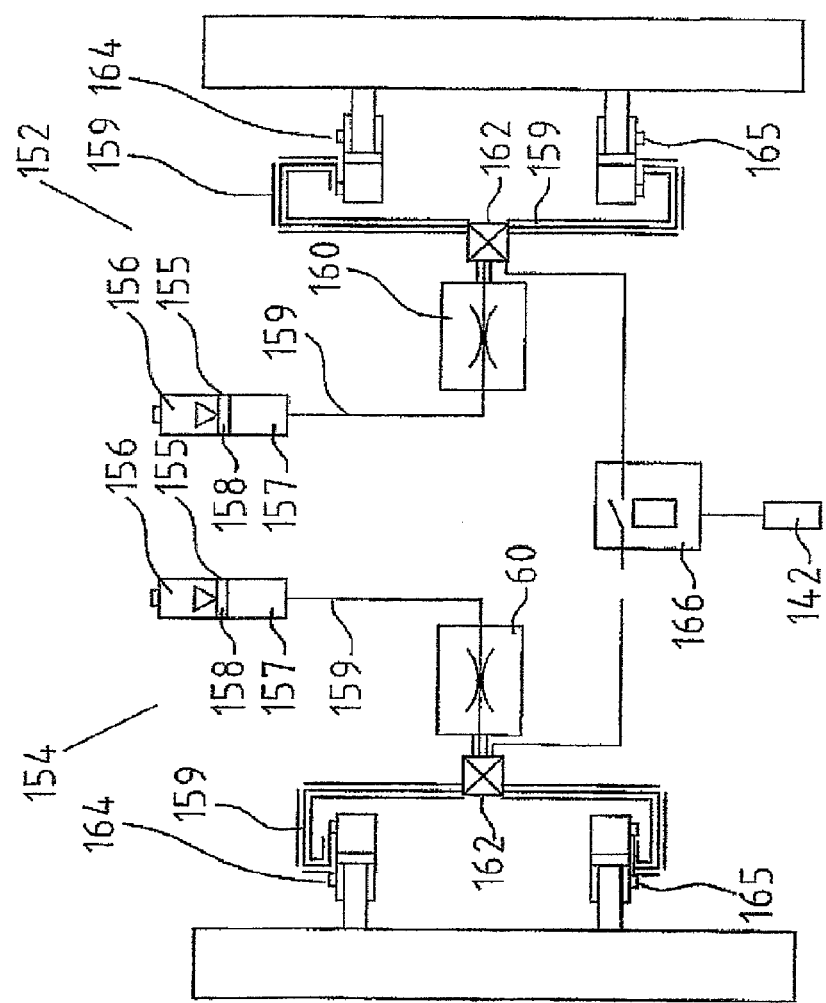
FIG. 19 is a schematic illustration of a suspension system for the articulated dump truck shown in FIG. 17.

Referring to FIGS. 17 to 19 of the drawings, there is illustrated another articulated dump truck according to another embodiment of the invention indicated generally by the reference numeral 130. The dump truck 130 comprises a tractor unit 132 sitting on a single non-steering axle with wheels 133. The tractor unit 132 is connected to an associated trailer unit 135 having an open topped container 136 mounted on a chassis 137 with wheels 138. The tractor unit 132 is connected to the trailer unit 135 by means of an articulating hitch indicated generally by the reference numeral 140. The hitch 140 is free to rotate about longitudinal and vertical axes of the dump truck 130 but is unable to rotate about a transverse axis of the dump truck 130. Steering is achieved by the forced articulation of the hitch 140 about its vertical axis creating a turn angle between the tractor unit 132 and trailer unit 135. Turning of the tractor unit 132 relative to the trailer unit 135 is shown in broken outline in FIG. 17. A sensor 142 mounted at the hitch 140 detects turning of the tractor unit 132 relative to the trailer unit 135 and locks a suspension system of the tractor unit 132 when a preset turning of the tractor unit 132 relative to the trailer unit 135 is reached.

FIG. 19 schematically shows a hydropneuratic suspension for the tractor unit 132. This essentially comprises a right hand hydropneumatic spring assembly indicated generally by the reference numeral 152 operably connected to a right hand front wheel 133 of the tractor unit 132. Similarly a left hand hydropneumatic spring assembly 154 is operably connected to a left front wheel 133 of the tractor unit 132. The hydropneumatic spring assemblies 152, 154 are similar and essentially comprise a gas cylinder 155 having a gas chamber 156 and oil chamber 157. A separator piston 158 divides the gas cylinder 155 into the gas chamber 156 and oil chamber 157. An oil line 159 connects through a restictor 160 and a lockout valve 162 with a pair of oil cylinders 164, 165 operably connected to the associated wheel 133 for controlling vertical movement of the wheel 133.

Each lockout valve 162 is a solenoid operated valve having a normally open position. A switch 166 associated with the sensor 142 is operable to supply power to close the lockout valve 162 when the tractor unit 132 turns beyond a pre-set angle relative to the trailer unit 135 as detected by the sensor 142. When closed the lockout valve 162 isolates the oil cylinders 164, 165 from the gas cylinder 155. When the lockout valve 162 is in the closed position the oil cylinders 164, 165 are hydraulically locked and vertical wheel travel is prevented.

The sensor 142 essentially comprises a proximity switch mounted on the vertical axis of the hitch 140 the targets for the proximity switch are mounted so that lockout only occurs for turning of the tractor unit 132 relative to the trailer unit 135 beyond a pre-set angle.

The steer or turn angle at which lockout occurs is selected to correspond to the maximum roll angle allowable for driver safety and/or comfort. The roll effect is limited by locking the suspension on the tractor unit 132 once the steer angle increases beyond a specified angle. This angle is effectively equivalent to the roll that would be experienced due to the centrifugal force, but is also infinitely variable within specified limits.

The invention is not limited to the embodiments hereinbefore described which may be varied in both construction and detail within the scope of the appended claims.

What is claimed is:

1. An articulated dump truck vehicle, including:
   a front tractor part connected to an associated rear trailer part by means of an articulated coupling which is mounted between a rear end of the tractor part and a front end of the trailer part,
   said articulated coupling being operable to allow the front tractor part and the rear trailer part to rotate relative to each other about a first vertical axis, with steering means for turning the front tractor part relative to the rear trailer part about said first vertical axis for steering the vehicle, and said articulated coupling also allowing the front tractor part and the rear trailer part to rotate relative to each other about a second longitudinal axis of the vehicle,
   the front tractor part having a front chassis, a pair of front wheels being mounted by a front suspension assembly on the front chassis, the front suspension assembly including an independent suspension system for mounting the pair of front wheels on the front chassis of the front tractor part, said front suspension assembly comprising an independent suspension module mounted on the front chassis,
   a prime mover mounted on said front tractor part and driveably connected to at least one pair of wheels on the vehicle,
   a vehicle driving station on said front tractor part with controls for vehicle drive and steering,
   the rear trailer part having a rear chassis, at least two pairs of rear wheels mounted by a rear suspension assembly on the rear chassis,
   a tipping container pivotally mounted on said rear trailer part with means for moving said tipping container on the rear chassis between a normally lowered load carrying position on the rear chassis and an inclined load tipping position on the rear chassis.

2. An articulated dump truck as claimed in claim 1 wherein said independent suspension module includes an axle housing with means for attachment to the front chassis, the two front wheels being pivotally mounted at opposite sides of said axle housing for vertical movement, each front wheel being mounted by one or more suspension arms on the axle housing, each suspension arm being pivotally connected to the axle housing and to a wheel carrier on which the front wheel is rotatably mounted to allow vertical movement of the wheel on the axle housing, and spring means mounted between a suspension arm or the wheel carrier and the front chassis to resist vertical wheel movement.

3. An articulated dump truck as claimed in claim 2 wherein a pair of suspension arms are provided, namely an upper suspension arm and a lower suspension arm which are vertically spaced-apart, each of the upper suspension arm and the lower suspension arm having an inner end and an outer end, the inner end of each suspension arm being pivotally connected to the axle housing and the outer end of each suspension arm being pivotally connected to the wheel carrier.

4. An articulated dump truck as claimed in claim 1 wherein the front suspension assembly includes a suspension unit for each front wheel, said suspension unit having one or more suspension arms, each suspension arm being pivotally connected to the front chassis and to a wheel carrier on which the front wheel is rotatably mounted to allow vertical movement of the front wheel on the front chassis, and spring means mounted between a suspension arm or the wheel carrier and the front chassis to resist vertical wheel movement.

5. An articulated dump truck as claimed in claim 4 wherein a pair of suspension arms are provided, namely an upper suspension arm and a lower suspension arm which are vertically spaced-apart, each of the upper suspension arm and the lower suspension arm having an inner end and an outer end, the inner end of each suspension arm being pivotally connected to the front chassis and the outer end of each suspension arm being pivotally connected to the wheel carrier.

6. An articulated dump truck as claimed in claim 3 wherein the spring means includes a coil spring and associated damper housed within the spring and mounted between a lower mounting bracket and an upper mounting plate, the lower mounting bracket having a spring holder with downwardly extending forked arms which engage the lower control arm by means of a pivot pin, the upper mounting plate being secured by bolts to the front chassis.

7. An articulated dump truck as claimed in claim 2 wherein a top of the axle housing is bolted to an underside of the front chassis.

8. An articulated dump truck as claimed in claim 2 wherein the front chassis includes a pair of spaced-apart longitudinal members interconnected by cross members, the axle housing being bolted to an underside of cross members between the longitudinal members.

9. An articulated dump truck as claimed in claim 3 wherein pivot pins are provided at each end of the suspension arms which rotatably engage in complementary pivot blocks mounted on the wheel carrier, on the axle housing or on the front chassis, the upper suspension arm being I-shaped having a pair of laterally extending pivot pins at each end which project forwardly and rearwardly of the upper suspension arm to rotatably engage the pivot blocks, the lower suspension arm being of wishbone construction and has a pair of laterally extending pivot pins at an outer end which project forwardly and rearwardly of the lower suspension arm to rotatably engage associated pivot blocks on the wheel carrier, inwardly extending fork arms of the lower suspension arm each having at their inner end a laterally extending pivot pin which rotatably engages an associated pivot block on the axle housing or front chassis.

10. An articulated dump truck as in claim 1 wherein said tipping load container does not extend substantially over the steer axis so that the centre of gravity of the loaded container is normally between the axes of rotation of the rear wheels or only slightly in front of the axle closest to the steer axis.

11. An articulated dump truck as in claim 1 in which an anti-roll bar is fitted to the front independent suspension.

12. An articulated dump truck as in claim 1 in which the front wheels are steerable on the front chassis, the dump truck further comprising:

sensing means to measure one or more of the vehicle speed and the steer angles of the front wheels and of the articulation joint.

13. An articulated dump truck as claimed in claim 12 having means for locking articulation around the vertical steering axis.

14. An articulated dump truck as claimed in claim 12 having means for locking the front wheel steering.

15. An articulated dump truck as claimed in claim 1 that includes a motion control system having means for controlling operation of the vehicle suspension system in response to pitch, roll or yaw movement of the vehicle, wherein said means controls operation of the tractor suspension system in response to pitch, roll or yaw movement of the vehicle.

16. An articulated dump truck as claimed in claim 15 having a roll control system which includes means for stiffening the suspension in direct proportion to the amount of roll.

17. An articulated dump truck as claimed in claim 16 which includes means for locking the suspension when a preset roll angle is reached.

18. An articulated dump truck as claimed in claim 15 having a roll control system which includes means for controlling operation of the suspension system in response to the sensed turn angle between the tractor and the trailer.

19. An articulated dump truck as claimed in claim 18 wherein the roll control system includes means for sensing turning of the tractor unit relative to the trailer unit and suspension locking means operably connected to the sensing means to lock the suspension when a preset turn angle is reached, and release the suspension for normal operation below said preset turn angle.

20. An articulated dump truck vehicle, including:
a front tractor part connected to an associated rear trailer part by means of an articulated coupling which is mounted between a rear end of the tractor part and a front end of the trailer part,
said articulated coupling being operable to allow the front tractor part and the rear trailer part to rotate relative to each other about a first vertical axis, with steering means for turning the front tractor part relative to the rear trailer part about said first vertical axis for steering the vehicle, and said articulated coupling also allowing the front tractor part and the rear trailer part to rotate relative to each other about a second longitudinal axis of the vehicle,
the front tractor part having a front chassis, a pair of front wheels being mounted by a front suspension assembly on the front chassis,
a prime mover mounted on said front tractor part and driveably connected to at least one pair of wheels on the vehicle,
a vehicle driving station on said front tractor part with controls for vehicle drive and steering,
the rear trailer part having a rear chassis, at least two pairs of rear wheels mounted by a rear suspension assembly on the rear chassis,
a tipping container pivotally mounted on said rear trailer part with means for moving said tipping container on the rear chassis between a normally lowered load carrying position on the rear chassis and an inclined load tipping position on the rear chassis,
front suspension assembly including an independent suspension system for mounting the pair of front wheels on the front chassis of the front tractor part, the front suspension assembly includes a suspension unit for each front wheel, said suspension unit having a pair of suspension arms, each suspension arm being pivotally connected to the front chassis and to a wheel carrier on which the front wheel is rotatably mounted to allow vertical movement of the front wheel on the front chassis, and spring means mounted between a suspension arm or the wheel carrier and the front chassis to resist vertical wheel movement, the suspension arms comprising an upper suspension arm and a lower suspension arm which are vertically spaced-apart, each of the upper suspension arm and the lower suspension arm having an inner end and an outer end, the inner end of each suspension arm being pivotally connected to the front chassis and the outer end of each suspension arm being pivotally connected to the wheel carrier.

* * * * *